Jan. 31, 1933.   R. G. A. PHILLIPS   1,895,520
SYSTEM OF JUSTIFYING TYPE LINES
Filed Nov. 25, 1930   2 Sheets-Sheet 1

Inventor
Reginald G. A. Phillips,
By Baker, Golrick & Teare,
Attorneys

Fig. 9
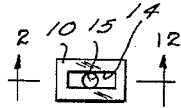
Fig.— 11
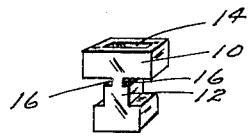
Fig.— 13
Fig.— 10
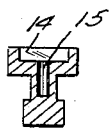
Fig.— 12
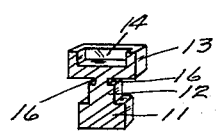
Fig.— 14
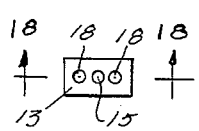
Fig.— 17
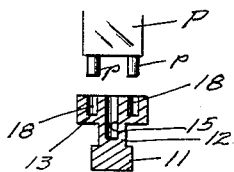
Fig.— 18
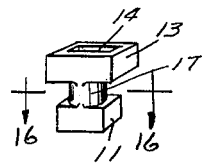
Fig.— 15
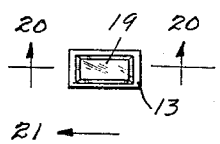
Fig.— 19
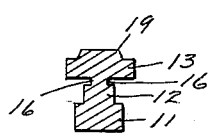
Fig.— 20
Fig.— 16
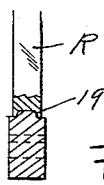
Fig.— 21
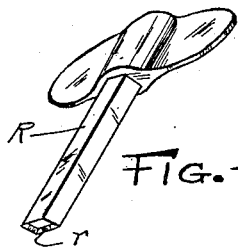
Fig.— 22

Patented Jan. 31, 1933

1,895,520

UNITED STATES PATENT OFFICE

REGINALD G. A. PHILLIPS, OF CLEVELAND HEIGHTS, OHIO, ASSIGNOR, BY MESNE ASSIGNMENTS, TO AMERICAN MULTIGRAPH CO., OF WILMINGTON, DELAWARE, A CORPORATION OF DELAWARE

SYSTEM OF JUSTIFYING TYPE LINES

Application filed November 25, 1930. Serial No. 497,974.

This invention relates to the justification of lines of type, and more particularly to lines of short groove type which are adapted to fit loosely in a suitable holder having parallel undercut channels. To effect justification of lines of such aligned type, I propose to employ spacing quads having grooved shanks, whereby they may be set in the line between successive words as usual, but these quads have non-circular heads which are adapted to be turned with reference to the portions of the quads within the channels, whereby the longitudinal space occupied by the head is increased and the line is thus spread.

With my invention I make the quads of such material and of such shape that the head may be readily engaged by a suitable tool and turned through a suitable angle to cause the head to lie in a new position between adjacent words without causing any change in the shape of the head itself. The amount of turning of the head varies with the amount the complete line is to be spread, but in any case is materially less than 90°, usually much less, as the head achieves its maximum spreading when the diagonally opposite corners have been brought into the line of the row of type.

I use for the quad a soft, tough metal, which enables the head to be twisted with reference to the rest of the quad without danger of being broken therefrom, and to increase the ease of turning, I may mechanically weaken the shank of the quad by removal of metal thereof either internally or externally. I also form the head with one or more recesses or projections so that it may be engaged by a convenient tool to enable the head to be turned without being mutilated.

Figure 1:
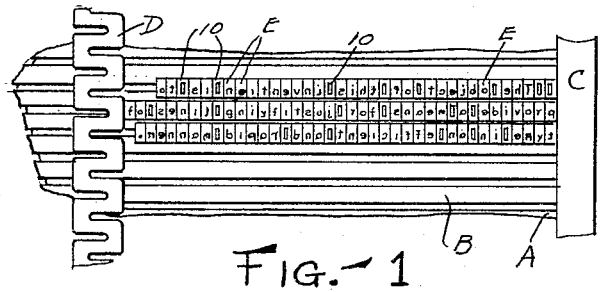
Figure 2:
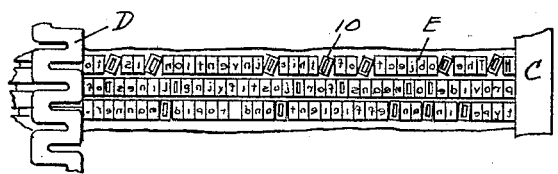
Figure 3:
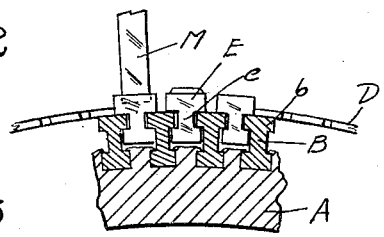
Figure 4:
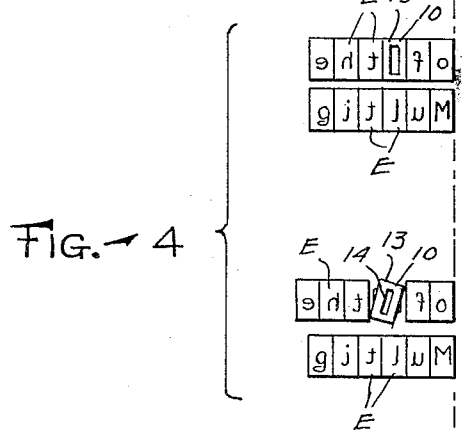
Figure 5:
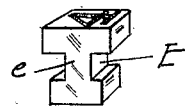

Several embodiments are illustrated in the drawings hereof, in which Fig. 1 is a view of several unjustified lines of type set up with my quads in a suitable holder; Fig. 2 is a view of the same lines after the quad heads have been turned to justify the lines; Fig. 3 is a cross section on a larger scale through the form of Figs. 1 or 2, indicating also a tool applied to one of the quads for turning a head thereof; Fig. 4 is a diagram illustrating the spreading action of the head of my quad; Fig. 5 is a perspective of one of the grooved type with which my quad is adapted to be associated; Figs. 6 to 21 inclusive are views illustrating different forms of quads embodying my invention and the turnable head—each view being a perspective, a section or plan; Fig. 22 is a perspective of a suitable tool for turning my quads when embodied in the form shown in Figs. 19, 20 or 21.

In Figs. 1, 2 and 3, A indicates a segment of a suitable drum carrying parallel rails B which have overhanging heads $b$ to provide suitable undercut channels, after the manner of the well known multigraph drum. In these views C indicates a fixed stop for one end of the line, and D a suitable strap adapted to be located as desired to define that end of the line. In these views, and in Figs. 4 and 5, E indicates the usual character type which has grooves $e$ on its opposite sides, which cooperate with the rail heads $b$, by which the type are slidably retained in the channels.

My quads indicated generically by the numeral 10 have bodies of a form similar to the type but are not high enough to come to the printing surface, and are adapted to be set up in the line of type by the same mechanism which assembles the character type. These quads 10 have feet 11, shanks or necks 12 and heads 13 of the same external dimensions as the type. In Figs. 1 to 15 inclusive, I have shown the heads 13 as provided with rectangular pockets 14 extending lengthwise of the head and suitable for the reception of a suitable tool corresponding to the screw driver blade M, shown in Fig. 3.

These pockets 14 are entirely surrounded by the wall of the head and extend downwardly in the head for a depth of about half the thickness of the head. The pockets are thus readily adapted for the insertion of the turning blade; at the same time, the metal about the pocket is sufficient to prevent the distortion of the head when it is turned.

After the quads are set up in lines of various length, as shown in Fig. 1, and in the upper part of Fig. 4, the tool M is inserted in the pocket of one quad after another and the same is given a slight turn to skew the head with reference to the rest of the body, whereby its diagonally opposite corners engage and spread the adjacent words, as shown particularly in Fig. 2 and in the lower portion of the diagram of Fig. 4. The result of the turning of the quad heads is to bring all of the lines to the same length, or justify them, as indicated in Fig. 2.

Figure 6:
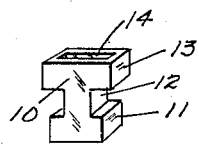
Figure 7:
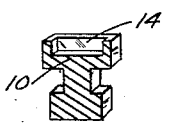
Figure 8:
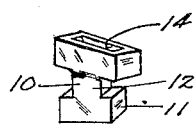

In Figs. 6 to 10 inclusive, it will be seen that Figs. 6, 7 and 9 indicate this particular form of quad 10 before the head has been twisted, and Figs. 8 and 10 the same quad after the twisting has been effected.

To increase the ease by which the head may be turned, I may weaken the shank by forming a downwardly extending hole into it as shown at 15 in Figs. 11 and 12; or, if desired, I may weaken the shank by reducing its external thickness as by the grooves 16 of Figs. 13 and 14.

In place of causing the twisting to come between the head and the shank, I may, if desired, make the shank cylindrical as shown at 17 in Figs. 15 and 16. In that case, the rectangular foot 11 forms the anchorage and the whole shank, or the upper portion of it, may turn with the head.

In place of making the elongated rectangular pocket 14 in the head, I may provide a pair of holes 18, Figs. 17 and 18 adapted to receive a pair of prongs *p* on a suitable spanner tool P.

In place of the rectangular depression 14 or the spanner holes 18, I may provide the quad head 13 with an upwardly extending rectangular boss 19, Figs. 19, 20 and 21, adapted to be engaged by the corresponding socket *r* in a suitable tool R, Figs. 21 and 22. In this case the head proper is of reduced height so that the top of the boss 19 will be a suitable distance below the printing surface.

It will be seen that in all these embodiments I have provided the head with suitable shoulders by which it may be engaged by the end of a tool moved downwardly against the quad without engaging the type on opposite sides thereof; and, in any case, a suitable twisting of the tool twists the head of the quad with reference to the anchored portion thereof to cause the head to lie in the new spreading position.

It will be noticed that in Fig. 1 the top line as originally set is shorter than the bottom line. Accordingly, the quad-heads in the top line are given more of a turn than those in the bottom line. With a little experience, the operator learns to observe the shortage of the line and to estimate how much the quad is to be turned, and gives a greater turning to each quad of the shorter lines. The result is that after the operation is completed, the spaces between the words in any line are substantially equal, though these spaces may differ somewhat in different lines. In ordinary operation, the whole form or column is set up, and then the operator goes over it with the hand tool and twists the different quads as necessary to justify the successive lines.

I claim:—

1. A method of justifying comprising assembling of lines of various length with quads between the words and thereafter twisting the quads about up-and-down axes to cause them to spread the line in which they are set.

2. A method of justifying comprising setting up a line of grooved type with grooved quads between the words, the type and quads occupying undercut channels in a suitable holder, and thereafter twisting the heads of quads with reference to the body portion held in the holder, said heads being non-circular so that the twisting spreads the line.

3. A method of justifying comprising setting up a line of grooved type with grooved quads between the words, undercut channels in a suitable holder, the grooves being in the shanks of the type and quads and embracing the inwardly overhanging ledges of the channels with the heads of the type and quads free from the channels and thereafter twisting the heads of quads with reference to the bodies thereof held in the channels, said heads being non-circular so that the twisting spreads the line.

4. A method of justifying comprising setting up lines of different length composed of grooved type and grooved quads in undercut channels in a suitable holder, said quads having rectangular heads, thereafter by a suitable hand tool twisting the heads of the quads without distorting them to cause their diagonally opposite corners to bear against and spread the type on opposite sides thereof.

5. A method of justifying comprising setting up lines of different length composed of grooved type and grooved quads in undercut channels in a suitable holder, the quad heads being rectangular and each head being provided with shoulders for the engagement of a turning tool, providing stops limiting the ends of the lines, thereafter twisting the heads of the quads to cause their diagonally opposite corners to bear against and spread the type on opposite sides thereof.

6. A quad for justifying a line of type, comprising a body having a head which may be twisted with reference to the body, the head having one or more recesses or projections in a region entirely surrounded by the margin of the head for the engagement of a tool to turn the head without distorting it.

7. A quad for justifying a line of type comprising a member having a body and a head, which head has a rectangular pocket in its face entirely surrounded by the material of the head.

8. A quad for justifying a line of type comprising a member having a body and a head, which head has a projecting non-circular boss adapted to be engaged by a socketed tool for turning the head.

9. A quad for justifying a line of type comprising a grooved body and a head, the head having in it a pair of holes for the entry of a spanner tool to twist the head.

10. A justifying quad for a line of type, said quad having a foot, a shank and a non-circular head, said head being formed for the engagement of a tool adapted to twist the head, and said shank being weakened.

11. A justifying quad having a foot, a shank and a head, the head being provided with means for the engagement of a turning tool and there being an opening through the head into the shank to weaken the shank.

12. A justifying quad having a foot, a shank and a head, the head having means whereby it may be turned and the shank being weakened by one or more grooves made into its exterior.

13. A justifying quad having a rectangular foot, a round shank and a non-circular head provided with shoulders for the engagement of a turning tool.

14. A justifying quad having a rectangular head with a pocket therein entirely surrounded by the wall of the head, said quad having a reduced neck below the pocket.

15. The combination with suitable type, of a quad having a head with an upstanding rectangular boss thereon standing less than printing height, and adapted to be engaged by the socketed end of a suitable tool.

16. A quad for justifying a line of type comprising a member having a neck and a head overhanging the neck on opposite sides thereof, which head has a rectangular pocket in its face entirely surrounded by the material of the head.

17. A quad for justifying a line of type comprising a member having a body with grooves in its opposite sides and a head, which head has a projecting non-circular boss adapted to be engaged by a socketed tool for turning the head.

In testimony whereof, I hereunto affix my signature.

REGINALD G. A. PHILLIPS.